United States Patent [19]

Stanish et al.

[11] Patent Number: 4,959,921

[45] Date of Patent: Oct. 2, 1990

[54] DEVICE FOR CUTTING OR SHREDDING LARGE PIECES OF BAIT INTO SMALLER ONES WHILE BEING TOWED THROUGH WATER

[76] Inventors: Alan J. Stanish; Dane T. Stanish; Andrew J. Stanish, all of 537 N. Rainbow Dr., Hollywood, Fla. 33021

[21] Appl. No.: 396,087

[22] Filed: Aug. 21, 1989

[51] Int. Cl.⁵ .............................................. A01K 97/02
[52] U.S. Cl. ................................................... 43/44.99
[58] Field of Search ........................... 43/44.99, 42.06; 119/51

[56] References Cited

U.S. PATENT DOCUMENTS

| | | | |
|---|---|---|---|
| 2,465,127 | 3/1949 | Stark | 43/44.99 |
| 2,709,317 | 5/1955 | Pease | 43/44.99 |
| 2,769,268 | 11/1956 | Miller | 43/42.06 |
| 2,952,935 | 9/1960 | Jordan | 43/42.06 |
| 3,124,891 | 3/1964 | Van Sant | 43/42.06 |
| 3,546,806 | 12/1970 | Hatta | 43/44.99 |
| 3,835,572 | 9/1974 | Mounsey | 43/42.06 |
| 4,685,242 | 8/1987 | Stanish | 43/44.99 |
| 4,742,638 | 5/1988 | Vobejda | 43/44.99 |
| 4,829,705 | 5/1989 | Dorsey | 43/44.99 |

Primary Examiner—Kurt Rowan
Attorney, Agent, or Firm—Karl Geci

[57] ABSTRACT

A device for cutting or shredding fish into chum or bait size pieces while the device is towed through water which operates by water turning a propeller and shaft having cutters positioned along the shaft. Surrounding the cutters is a perforated container, hinged for easy opening, loading of the large pieces of fish and closing, with wings or stabilizers symmetrically affixed to each side. A cutting or shredding operation is effected by towing the device through water causing rotation of the propeller and shaft with cutters affixed inside the perforated container containing large pieces of fish or bait. As the shaft and cutters rotate inside the perforated container, the chum or bait is cut or shredded into small pieces which are then washed out through the holes in the container thereby attracting game fish. The device may be made a multitude of colors thereby additionally acting as a colorful lure to game fish.

3 Claims, 3 Drawing Sheets

DEVICE FOR CUTTING OR SHREDDING LARGE PIECES OF BAIT INTO SMALLER ONES WHILE BEING TOWED THROUGH WATER

FIELD OF THE INVENTION

The invention relates to a towed, waterborne, propeller operated device for shredding or cutting bait having a perforated container, cutters mounted on a rotatable shaft with a propeller affixed on the aft end and stabilizers mounted on the sides of the perforated container. Our new CHUM TROLLER is a device that enables bait or chum to be cut or shredded while it is being towed through the water as in a fishing boat trolling.

BACKGROUND OF THE INVENTION

The purpose underlying the invention is to enable trolling fishermen to provide their own chum or bait from available scraps or discarded fish at the point where fishing is being done. Utilizing the invention, a fisherman, while trolling, can handily attract game fish, without the mess, risk of accident while handcutting bait on board a moving boat and while saving money by making use of available discarded fish and scraps of fish rather than purchasing frozen blocks of chum or loose pieces of chum. Additionally, the device can incorporate various colors so as to act as a colorful lure to game fish.

SUMMARY OF THE INVENTION

The invention enables one to provide cut bait, while trolling for fish, by bowing the device through water. As the device is moving through the water its'affixed propeller rotates causing the thin rectangular plates positioned along the propeller shaft to act as cutters upon the bait fish encased in a perforated container. The perforated container then allows the shredded chum or bait to pass through and attract game fish. The perforated container has eyelets on the end opposite the propeller end for a tow rope or bridle. The perforated container is made of symmetrical halves that when fitted together and secured surround the propeller shaft with enough clearance for the cutters to act freely inside the container. Slots are symmetrically affixed to each side of the device so as to accept horizontal stabilizing fins in two positions. On the top and bottom of the perforated container a small fin or skeg is affixed for enhanced stability and improved appearance of the device. In use, the container is opened and fish scraps or large pieces of bait are placed in the container and then the container is closed and secured. The device is then lowered into the water behind the trolling boat. As the boat moves forward through the water the propeller rotates the propeller shaft and the cutters positioner thereon, thereby cutting or chopping bait into small pieces. The small pieces of bait and released fish oils are washed out through the holes in the perforated container by water action thereby attracting game fish.

DETAILED DESCRIPTION OF THE DRAWINGS

Figure 1:
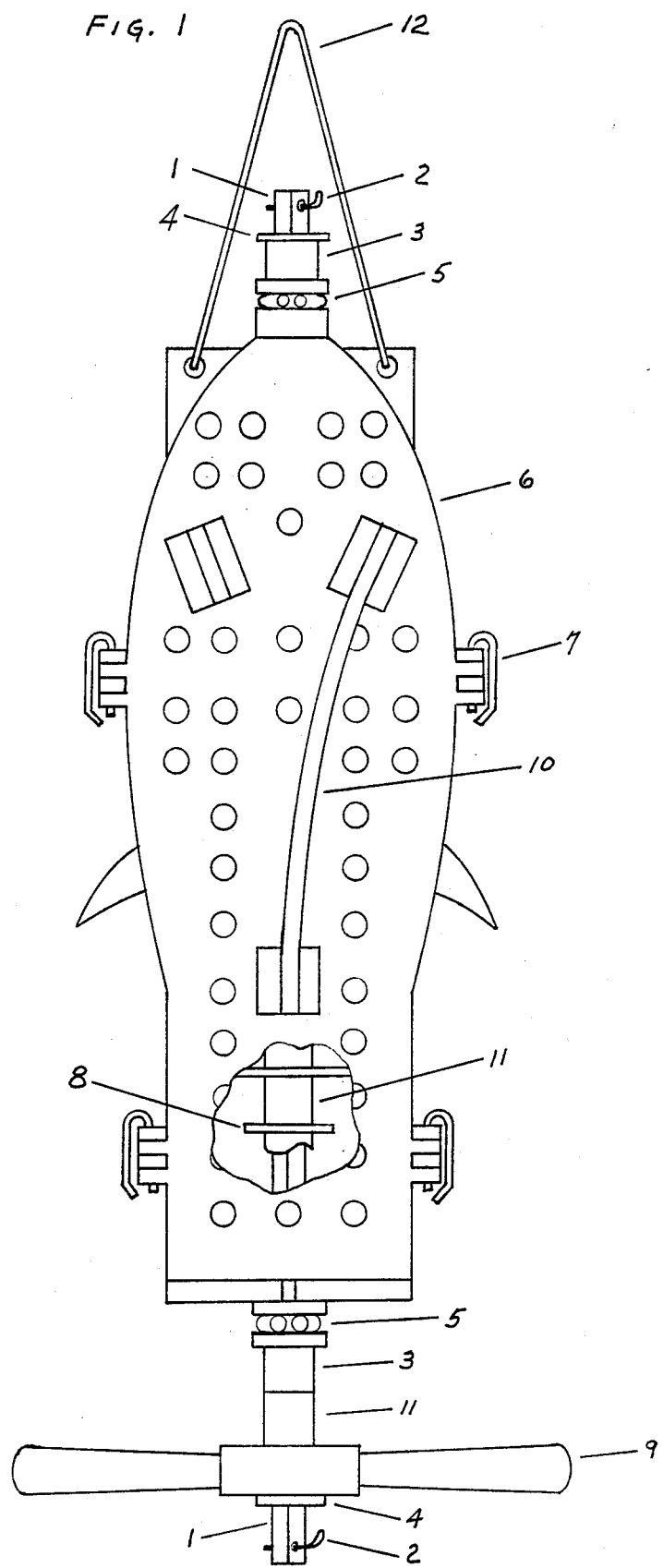
FIG. 1 shows a side view of a device embodying the invention.

The device for chopping or cutting bait while trolling as shown in FIG. 1 has a shaft 1 of sufficient length to pass through the perforated body, 6, lengthwise, with enough excess at the front end to attach a washer 4 and restrictive pin 2 and enough excess length at the aft end to slide the propeller 9 onto and secure with washer 4 and restrictive pin 2. At each end of the container grooves are made for retaining bushings 3 on which the propeller shaft 1 rotates. Cutters 8 and spacers 11 are slid onto the propeller shaft between the forward and aft bushings. Cutters 8 are spaced approximately 1 inch apart. The perforated container 6 is of sufficient size to accept large pieces of fish and having clearance for the cutters 8 to rotate freely inside said container. The perforated container is made in symmetrical halves with four hinge pins 7 and two spring clips 5 securing the halves together. Stabilizers or wings 10 are symmetrically affixed to each side of the container. A towing bridle 12 can readily be attached through two holes conveniently placed in the front of the device as shown in FIG. 1.

Figure 2:
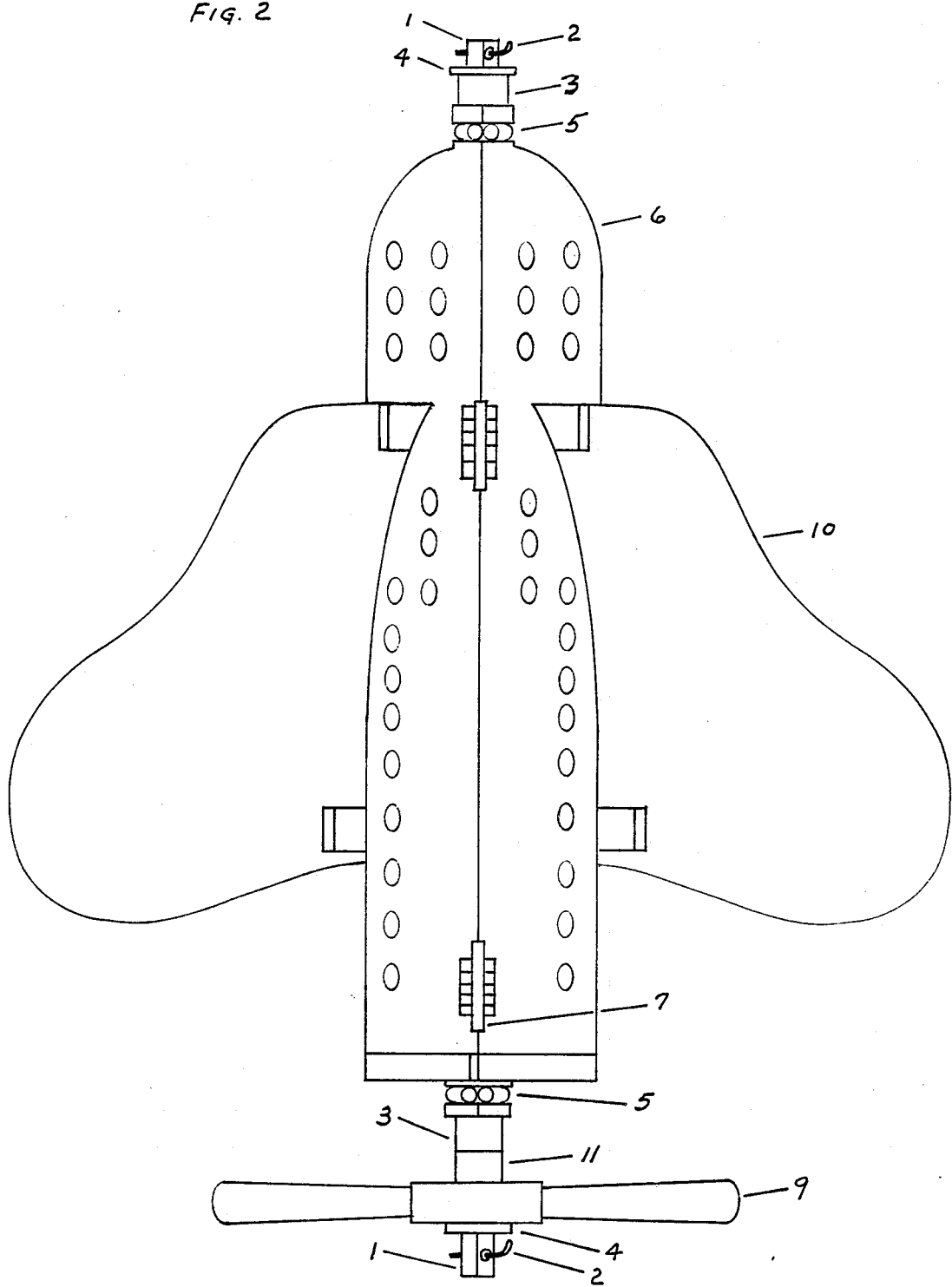
FIG. 2 shows a top view of the device.
Figure 3:
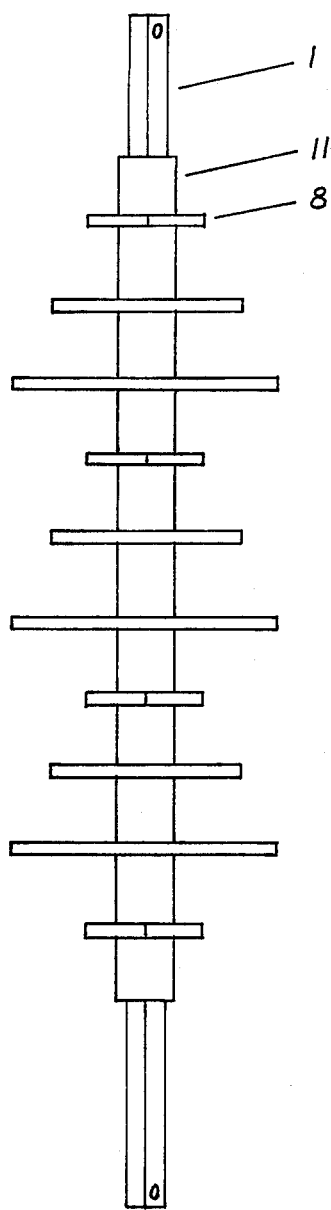
FIG. 3 shows a prospective view of the cutting blades and drive shaft.
Figure 4:
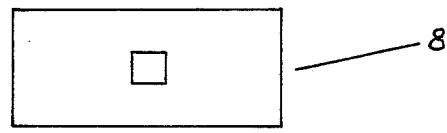
FIGS. 4, 5, and 6 show large, medium and small size cutting blades.
Figure 5:
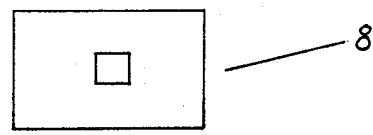
Figure 6:
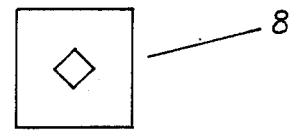
Figure 7:
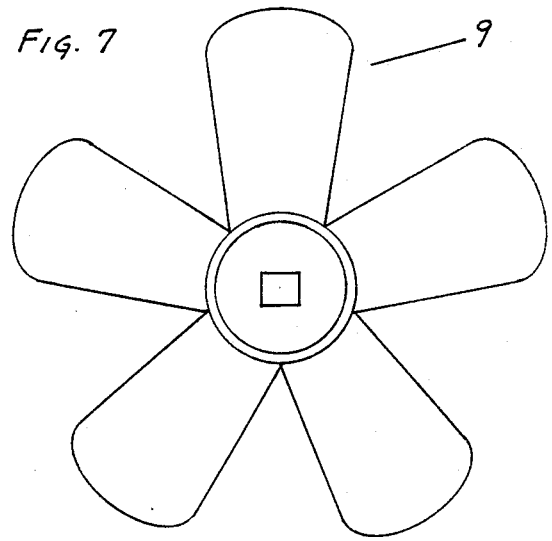
FIG. 7 is a prospective view of the propeller.

FIG. 2 is a top view of my chum trolling device showing more clearly the stabilizers 10.

FIGS. 3, 4, 5, and 6 show the propeller shaft 1, spacers 11, and cutters 8 and where it can be seen that the cutters are thin, rectangularly shaped and placed on the shaft with some rectangular cutters at ninety degrees relative to the drive shaft.

What is claimed is:

1. A waterborne apparatus for cutting and dispensing bait while being towed through water comprising a hinged perforated container, having a shaft mounted therein; means for cutting positioned inside said container on said shaft such that said means for cutting may rotate freely inside said container; a propeller affixed to the aft end of said shaft which rotates as the device moves through the water thereby rotating said means for cutting; stabilizers positioned on each side of said container, and two attachment points for a towing bridle on the forward end of said container.

2. The apparatus according to claim 1 wherein said means for cutting are thin rectangularly shaped plates of various sizes.

3. The apparatus according to claim 2 wherein said thin rectangularly shaped plates are placed at right angles along said propeller shaft.

* * * * *